United States Patent [19]

McMurtry

[11] 3,901,626
[45] Aug. 26, 1975

[54] ACTUATING MECHANISM FOR A VARIABLE PITCH FAN OR PROPELLER

[75] Inventor: David Roberts McMurtry, Bristol, England

[73] Assignee: Rolls-Royce (1971) Limited, London, England

[22] Filed: July 30, 1973

[21] Appl. No.: 383,510

[30] Foreign Application Priority Data
Aug. 10, 1972 United Kingdom............... 37304/72

[52] U.S. Cl. ................................................ 416/157
[51] Int. Cl.² ......................................... B64C 11/38
[58] Field of Search ............ 415/129, 130; 416/155, 416/156, 157

[56] References Cited
UNITED STATES PATENTS

| | | |
|---|---|---|
| 2,588,166 | 3/1952 | Sacchini............................ 416/156 |
| 2,666,490 | 1/1954 | Richmond.......................... 416/155 |
| 3,468,473 | 9/1969 | Davies et al. ....................... 416/157 |
| 3,545,881 | 12/1970 | Naulty ............................... 416/156 |

Primary Examiner—William L. Freeh
Assistant Examiner—L. J. Casaregola
Attorney, Agent, or Firm—Stevens, Davis, Miller & Mosher

[57] ABSTRACT

The actuating mechanism includes a hydraulic actuator, fluid supply tank, pump and control valve all contained within the rotating spinner at the hub of a fan or propeller rotor. The whole spinner with its mechanism is detachable as a separate module without the necessity of breaking hydraulic connections. A further feathering motor is provided on the static casing behind the fan or propeller which can drive the pump to operate the actuating mechanism when the fan or propeller is not being driven.

1 Claim, 2 Drawing Figures

ACTUATING MECHANISM FOR A VARIABLE PITCH FAN OR PROPELLER

The present invention relates to an actuating mechanism for a variable pitch fan or propeller, and has particular reference to such mechanism for a variable pitch fan of a gas turbine engine.

It is of prime importance in gas turbine engines for aircraft, to reduce the weight of all components as far as possible. This means in hydraulic systems that it is preferable to use high pressure pumps and motors but this increases the problems of sealing the system to prevent leakage.

In known systems for varying the pitch of a propeller, or fan, a hydraulic actuator mounted inside the rotating spinner is used to supply the torque for varying the pitch of the blades, and the hydraulic actuator is supplied with pressure fluid by a pump mounted externally on a static part of the engine casing. The pressurised fluid from the pump outside the engine has to be passed through a transfer muff to the hydraulic actuator on the inside, and thus the pressure of fluid which can be used is restricted to avoid excessive leakage from the muff.

It is also important in a variable pitch fan for a gas turbine engine to provide a motor, operable by the pilot, which is capable of feathering the fan blades during operation of the engine should a failure occur in the actuating mechanism, and of de-feathering the blades when the engine is not running in order to enable the engine to start.

It is preferable that the feathering and de-feathering motor should operate on a high pressure hydraulic actuation system to minimise the size of the motor and this is not possible where the hydraulic pressure is limited because it has to be transferred from the static to the rotating parts of the engine through a transfer muff.

One object of the present invention is to provide a hydraulic acuating mechanism which is capable of operation at a pressure up to or in excess of 3,000 p.s.i. and which reduces leakage to a minimum by eliminating the muff.

Another object of the invention is to provide a completely self-contained hydraulic actuating mechanism within the rotating hub of a variable pitch fan which can be assembled and removed as a complete module without having to be drained, and which can be actuated by an external static feathering motor.

According to the present invention there is provided an actuating mechanism for a variable pitch fan or propeller driven by an engine, said mechanism comprising a casing connected to, and rotatable with the fan or propeller about the axis of the engine, and containing, a hydraulic actuator connected to means for rotating the fan blades about their longitudinal axes to vary their pitch, a pump, a hydraulic fluid tank for supplying hydraulic fluid to the pump, and a valve which is supplied with fluid from the pump and is selectively operable to supply the fluid to the actuator, said actuator, pump, tank and valve all being connected to the casing for rotation therewith about the main engine axis, means being provided for driving the pump for supplying pressurised fluid to the actuator during normal operation of the engine, and auxiliary drive means being provided outside the rotatable casing and being connected for selectively providing a second drive to the pump.

By use of such an arrangement the pump, vane motor and valve can all be designed for operation at up to 3,000 p.s.i. without the need for a muff to transfer the pressurised fluid from the outside to the inside of the rotatable casing.

The tank is preferably in the form of an annular chamber, the outer wall of which is defined by the casing, and within which the pump is mounted.

Also in a preferred form of the invention the auxiliary drive means for the pump includes a motor which is capable of driving the pump when the fan is static in order to change the pitch for starting the engine, or in the event of an engine failure.

One example of the invention will now be more particularly described with reference to the accompanying drawings in which.

Figure 1:
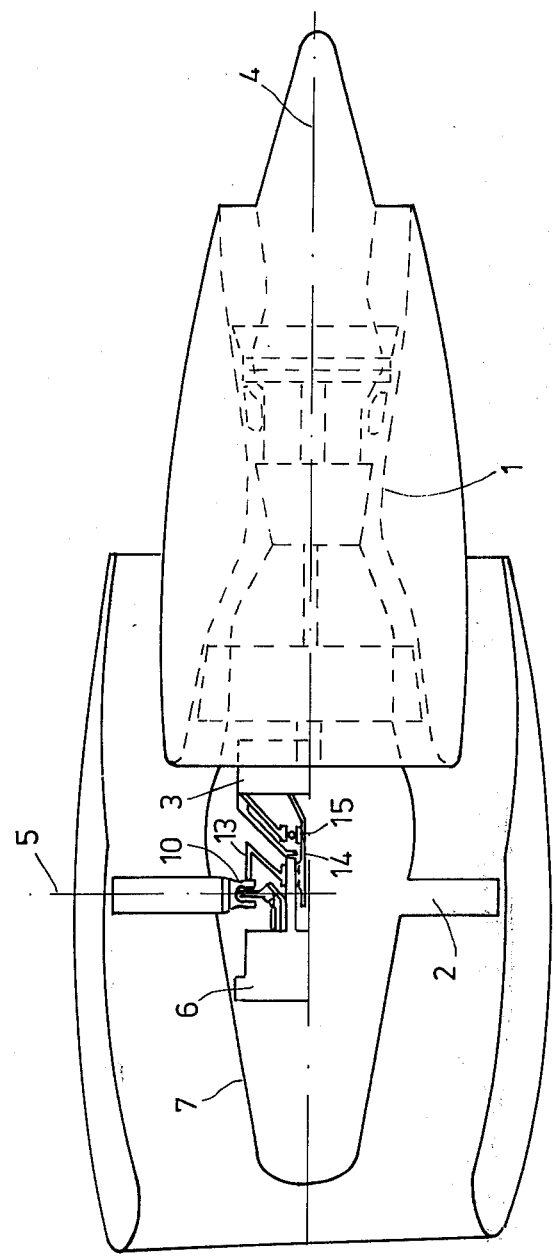
FIG. 1 is a diagrammatic representation of a variable pitch fan engine.

Referring now to the drawings, in FIG. 1 there is shown a variable pitch fan gas turbine engine comprising a core engine 1 which drives a fan 2 through a gear box 3. The fan rotates about a main engine axis 4, but in addition each fan blade is rotable about its own longitudinal axis 5 by means of an actuating mechanism disposed within a casing 6 within the rotating front portion of the engine casing 7, which is known as the spinner.

The fan blades 2 are mounted on a disc 10 which includes two hubs 11 and 12. The disc is driven by a cone 13 which is splined to a main drive shaft 14 which in turn is driven from the gear box 3. Shaft 14 is mounted for rotation in a bearing 15.

Figure 2:
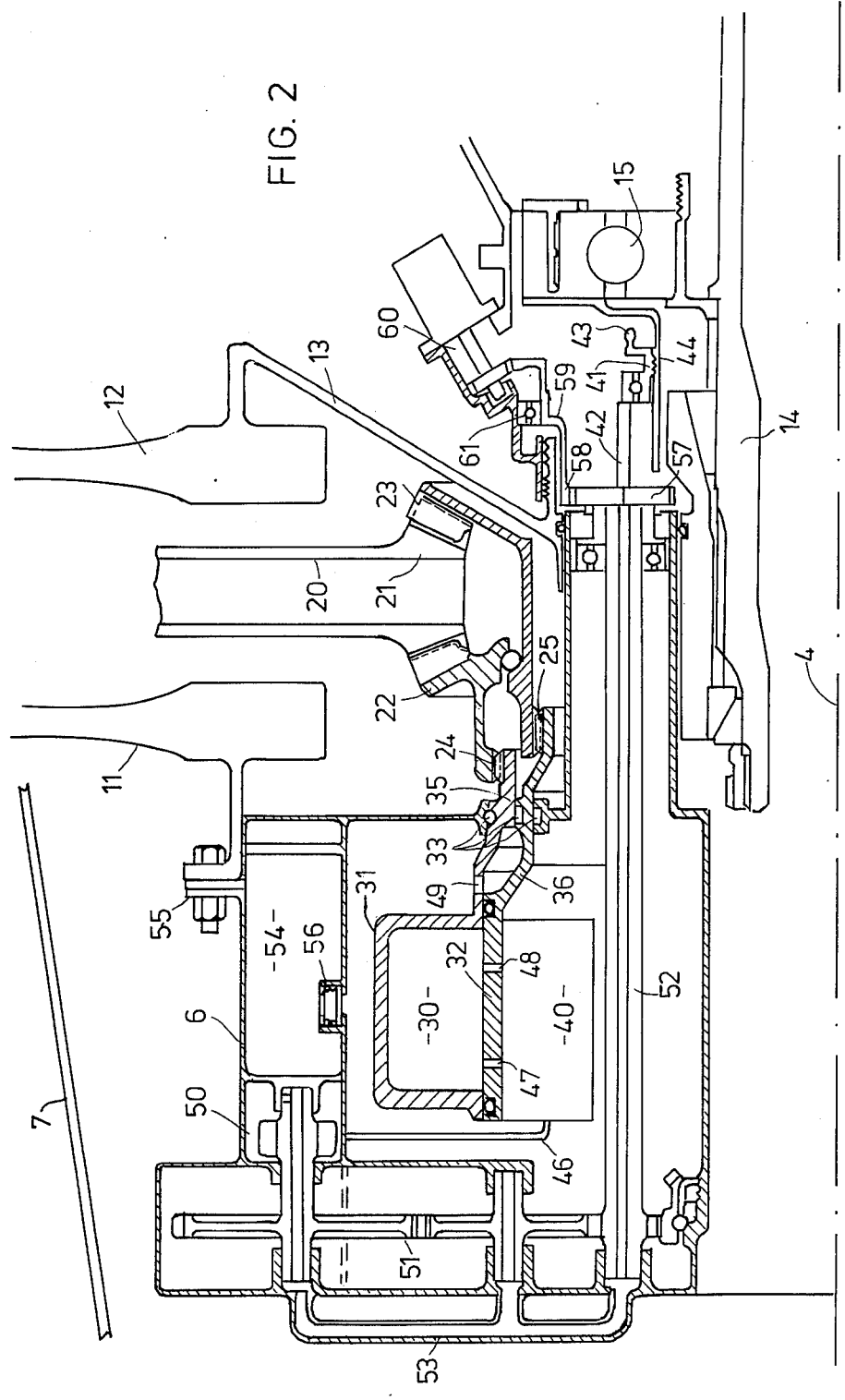
FIG. 2 is an enlarged sectional elevation of the actuating mechanism for varying the pitch of the fan of the engine of FIG. 1.

FIG. 2 illustrates the actuating mechanism in more detail. Rotation of each fan blade for pitch variation is effected through a shaft 20 which extends between the hubs 11 and 12 and is connected to the fan blade root. Each fan blade is mounted in a bearing (not shown). The radially inner end of the shaft 20 is formed with a bevel gear 21 which is driven by a pair of bevels 22 and 23 on opposite sides of the annular bevel 21. The bevels 22 and 23 are connected through splined connections 24 and 25 to oppositely-rotating parts of an annular vane motor 30, which constitutes the actuator.

The vane motor 30 comprises an outer casing 31 to which is connected a first series of vanes, and an inner casing 32 to which is connected a second series of vanes. The two series of vanes and the casings define two series of chambers which can be filled with, or emptied of, oil to cause rotation of the vanes, so as to drive the two casings, in opposite directions to cause rotation of the fan blades. Depending on which series of chambers is filled with oil, the fan blades can be made to rotate in either direction to increase the coursness of their pitch. Vane motors of this type are known and are described and illustrated in U.S. Pat. No. 3,664,763 (DOWTY POTOL). The vane motor is disposed within the casing 6 and seals 33 are provided where annular stub shafts 35 and 36, which carry the splines 24 and 25, protrude from the casing.

The oil is supplied to the required chambers in the vane motor through a selector valve shown diagrammatically at 40. This valve may be of any suitable type, for example, a suitable valve is described and illustrated in U.S. Pat. No. 3,690,788 (PEDERSEN). However the valve is preferably a rotary to linear follow-up servo valve of the type described and claimed in U.S. Pat. No. 3,802,799.

Such a valve is a spool valve having a central spool which moves within the vane motor inner casing. The design is such that the vane motor inner casing acts as the valve outer casing. Circumferentially inclined longitudinally extending slots in the spool communicate between a passage supplying oil from a pump and ports in the vane motor inner casing to supply oil to one series of chambers. Further inclined slots communicate simultaneously between a drain and ports in the vane motor inner casing for draining the other series of chambers. In operation, axial movement of the spool, brings the passage and ports into communication so that one of the series of chambers in the vane motor is supplied with oil, and the other series is drained. This causes rotation of the vane motor casing which tends to take the ports and slots out of communication due to the inclination of the slots. The actuation for the valve is not illustrated in detail in FIG. 2 because it would, in fact, be at a point further round the engine than the section of FIG. 2, and would pass through the drive cone 13 in another position. The actuation however consists of a nut 41 which is connected by a shaft 42 to the spool. Rotation of an arm 43 by a pilots lever or electric motor rotates the nut which engages a thread on a stationary tube to cause axial movement of the shaft. Oil is supplied to the valve from a pump 50 via pipes 46. The passages in the vane motor inner casing are shown at 47 and 48 and the oil drain from the motor is indicated at 49. Oil drained from the vane motor passes into the casing 6 and is returned to the pump as hereinafter described.

The pump 50 is a gear pump and is designed to operate at approximately 3,000 p.s.i. It can thus be relatively small as can the vane motor to which it supplies high pressure oil. The pump is contained within the casing 6 and is driven through a gear train 51 from a shaft 52 which passes out of a local extension of the casing 6 through a boss on the drive cone 13. A small bleed of oil is taken from the pump through a pipe 53 to lubricate the bearings of the gears in the gear train.

The pump is disposed within a tank 54 on the radially outer wall of casing 6, and since the casing is spinning round by virtue of a connection at 55 to the hub 11 of the fan disc, the oil at the inlet to the pump is pre-pressurised by centrifugal pressure in operation.

Also in operation, oil within the casing is flung to the radially outer wall due to centrifugal force and it is necessary only to have a small spring loaded ball valve 56 at the tank inlet to allow the oil to pass into the tank. The spring loading is such that the valve is always open when the engine is running due to contrifugal load on the ball, but closes as the speed drops. Thus the tank is always completely full. Oil draining from the selector valve or leaking into the casing 6 forms a thin layer on the radially inner wall of the tank and enters the tank through the valve 56. Thus there is virtually no opportunity for oil to leak from the chamber via the various seals.

The shaft 52 is driven by a gear 57 which meshes with a gear 58 on a shaft 59 outside the casing 6. During normal operation of the engine the shaft 59 is locked so as to be stationary relative to the shaft 52. Since the shaft 52 and gear 57 rotate with the casing around the main engine axis, the gear 57 rolls around the gear 58 and drives the gear train 51.

In order to provide a means of rotating the fan blades whilst the engine is stationary, the shaft 59 is rotatable by means of an auxiliary electric motor 60 which is mounted on the main engine casing, and the rotatable shaft 59 is supported for rotation in a bearing 61. This requirement arises under two sets of circumstances. The first arises if counterweights are used to counteract the centrifugal turning moments on the blades during operation, in which case the engine will tend to stop with the fan blades in their "feathered" position which makes the engine difficult to start. It is necessary, therefore, in this case to be able to "de-feather" the blades. The pilot merely selects fine pitch on selector valve 40 and then operates motor 60 to drive the pump to supply oil to the vane motor. The second circumstance is in the event of an engine shut down, where, to reduce windmilling drag of the fan blades it is necessary to turn the blades to the feathered position. If no counterweights are used, the centrifugal turning movements on the blades will tend to turn them to the "fine" position so that motor 60 must be capable of "feathering" the blades also. To achieve this, the pilot selects course pitch on the selector valve 40, and as the engine slows down motor 60 is operated by the pilot to maintain the oil pressure in the actuator.

Thus the invention provides an actuating system which, by using high pressure fluid, is small and compact, and by its positioning of the pump within the rotatable casing, solves the problem of having an external pump and a muff for transferring the high pressure oil.

Also, by having a tank on the radially outer wall of the rotating casing, all leakage oil is automatically fed back to the tank in operation and there is virtually no oil pressure within the casing. Thus the rotating casing can be sealed effectively and the whole hydraulic mechanism, i.e. the pump, tank, vane motor and selector valve can be assembled and removed as a complete module within the main fan module without having to be drained.

To facilitate this latter construction, all connections of parts from inside to outside the rotating casing are made of splined connections and all the seals are sliding seals.

I claim:

1. An engine comprising:
    a bladed rotor having variable pitch fan blades,
    means for rotating the fan blades about their longitudinal axes to vary their pitch,
    an actuating mechanism for varying the pitch of said fan blades, said mechanism comprising in combination, a casing, means connecting the casing to the bladed rotor for rotation therewith about the axis of the engine, a hydraulic actuator, a pump, a hydraulic fluid tank for supplying hydraulic fluid to the pump, and a valve supplied with fluid from the pump and selectively operable to supply the fluid to the hydraulic actuator,
    said actuator, pump, tank and valve all being contained within and rotatable with said casing,
    means for sealing the casing against egress of said fluid therefrom,
    means including a splined connection for connecting the actuator to the blade rotating means, means for driving the pump for supplying pressurised fluid to the actuator during normal operation of the engine, auxiliary drive means for selectively providing a second drive to the pump, said auxiliary drive means being disposed externally of the casing of the mechanism and being connected to drive the pump by means of a gear, and said actuating mechanism being a complete module which can be assembled and removed as a unit through disconnection of the splined connection.

* * * * *